Figure 1:
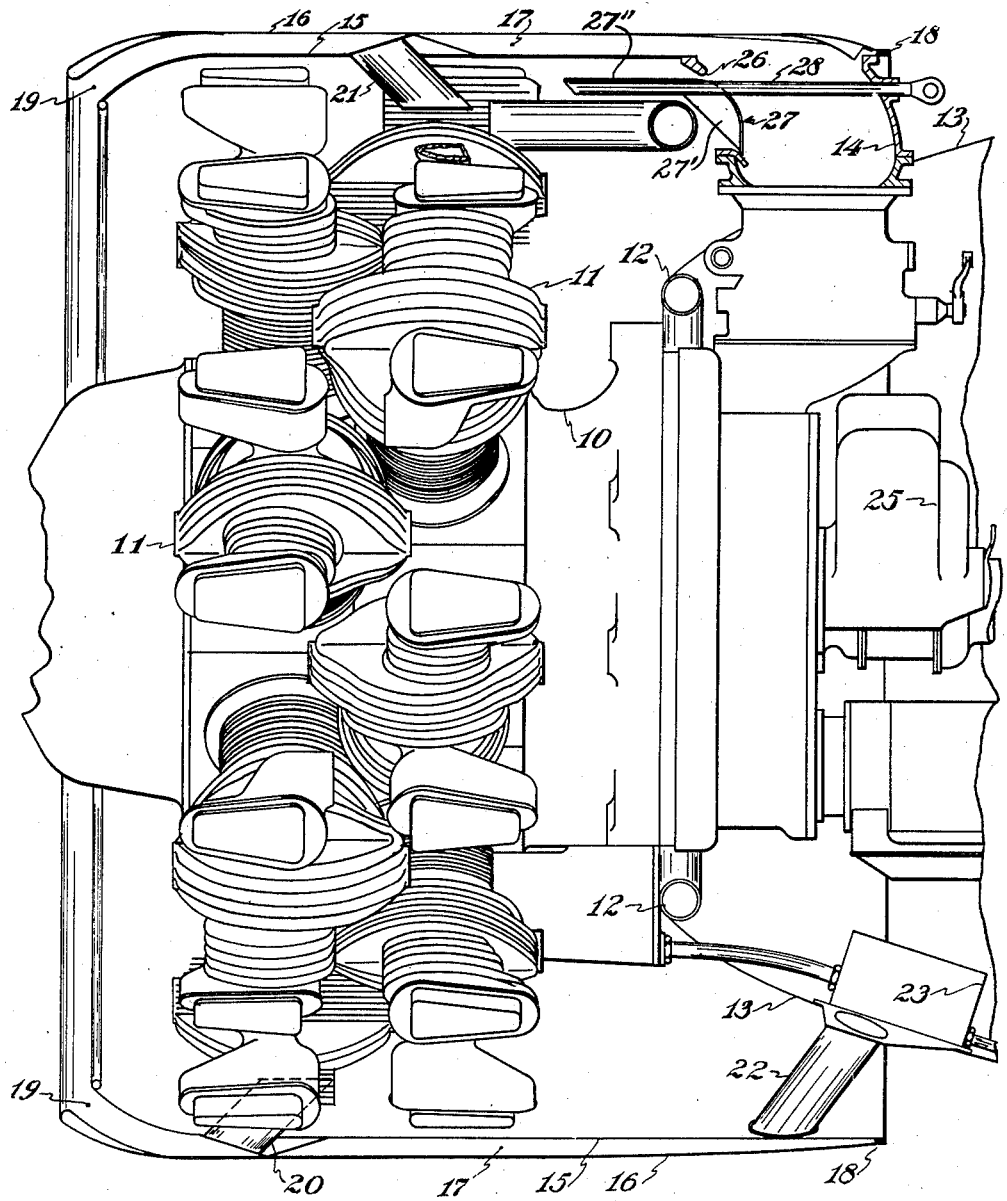

April 6, 1937.  R. CHILTON  2,076,224
ENGINE COWLING
Filed Feb. 14, 1934   2 Sheets-Sheet 1

INVENTOR
ROLAND CHILTON
BY
ATTORNEY

April 6, 1937.  R. CHILTON  2,076,224
ENGINE COWLING
Filed Feb. 14, 1934   2 Sheets-Sheet 2

INVENTOR
ROLAND CHILTON
BY
ATTORNEY

Patented Apr. 6, 1937

2,076,224

UNITED STATES PATENT OFFICE 2,076,224

ENGINE COWLING

Roland Chilton, Ridgewood, N. J., assignor, by mesne assignments, to The Reed Propeller Co., Inc., Garden City, N. Y., a corporation of New York Application February 14, 1934, Serial No. 711,163

9 Claims. (Cl. 123—171)

This invention relates to engine cooling systems, and is particularly concerned with the provision of annular cowling for radial cylinder air-cooled aircraft engines. With such engines, low drag cowlings are usually used to reduce the aerodynamic resistance or drag of the engine installation. It is a particular object of this invention to provide a special form of cowling whereby the air flow over certain parts of the engine may be augmented.

It is a further object to provide a double ring cowl having inner and outer spaced cowl rings so that an annular air space is provided therebetween, and to provide ducts entering the space between the two rings, these ducts serving to carry air from the annular space to certain parts of the engine and its installation.

In addition to the large quantity of air which must be directed over the cylinders for cooling, provision must also be made for supplying air to the carburetor intake, to an oil cooler and to the accessory compartment back of the engine so that the magnetos and electrical equipment attached to the engine may be kept cool. The large quantity of air for cooling of the engine cylinders is provided by the direct impingement of air flow from the propeller on to the cylinder fins, and in the past, the auxiliary air requirements have been supplied from external air scoops projecting from the fuselage into the aircraft slipstream. However, these external scoops are not wholly satisfactory, since they offer additional drag to the flight of the aircraft. It is a further object of the invention, therefore, to provide a source of cooling air supply for the engine accessories or the like which will not add to the head resistance of the engine installation.

Figure 2:
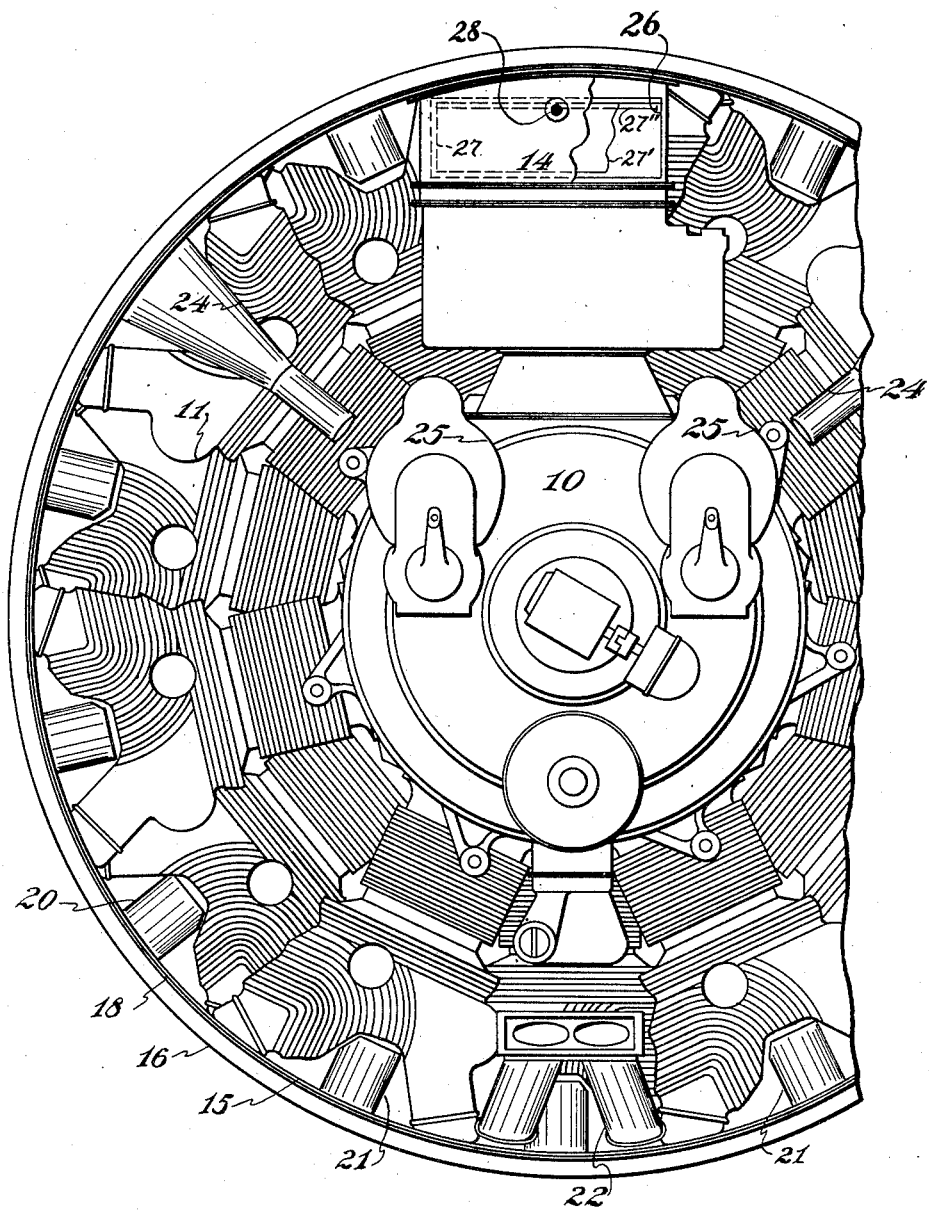

In the drawings, in which similar characters indicate similar parts:

Fig. 1 is a side elevation of an air-cooled radial aircraft engine with the ring cowl of this invention and certain parts of the engine installation shown in section; and Fig. 2 is a rear elevation of the engine equipped with the cowling of this invention.

The engine 10 is of conventional form, the particular embodiment shown having a plurality of radially extending air-cooled cylinders arranged in two banks of seven cylinders each, the engine cylinders being designated as 11. The casing of the engine 10 is shown as being attached to an engine mounting ring 12 forming the forward part of an aircraft fuselage. The casing likewise extends through the mounting ring 12, part lying rearwardly thereof and being enclosed by the streamline fuselage covering 13. Through the upper part of this covering 13 there projects a carburetor air inlet duct 14. The engine cylinders are encircled by an inner ring cowl 15, which in turn is encircled by an outer ring cowl 16 in spaced relation thereto, thereby providing an annular space 17 between the two cowlings. The rearward edges of the ring cowls 15 and 16 are attached to each other as at 18 to provide a relatively air-tight joint, while the forward edges of the ring cowls 15 and 16 are in annularly spaced relation to provide an air entrance annulus 19. The diameter of the forward edge of the inner ring cowl 15 is preferably of such diameter as to allow a substantial blast of air to enter within the inner ring cowl 15 to impinge directly upon the engine cylinders. The air entrance annulus 19 will therefore lie in a circle of fairly large radius, which will thus allow the annulus to lie behind an efficiently pitched portion of the propeller. Therefore, air is driven through the entrance annulus 19 into the space 17 between the two cowls. The leading edges of the ring cowls 15 and 16 are preferably inturned to improve the streamline conformation of the whole assembly, the diameter of the annular air entrance 19 being, therefore, somewhat less than the diameter of the engine itself.

A plurality of openings are formed in the inner ring cowl 15, and ducts may be attached to the ring cowl to register with these openings, whereby air may be directed to certain parts of the engine. For instance, a plurality of ducts 20 may be located directly over or between the forward bank of cylinders so that cooling air from the annular space is directed on the cylinder heads. Similarly, a plurality of ducts 21 may be organized to direct air over or between the cylinder heads of the rear bank of cylinders. A duct 22 is arranged toward the rearward portion of the cowling to permit air within the space 17 to be directed against an oil cooler 23. Ducts 24, shown in Fig. 2, are similarly arranged to direct a blast of cooling air upon the magnetos 25.

The carburetor air intake 14 is arranged to receive air either from the annular space 17 or from the space in which the engine cylinders also lie. To accomplish this end, a forwardly located opening 26 is formed in the air intake 14, this opening communicating with the space behind the engine cylinders. The upper part of the air intake communicates directly with the space 17. A valve 27 is carried by a rod 28 passing through the rear wall of the air intake 14, so that, by pushing the rod forwardly or rearwardly by a suitable remote control arrangement, air may enter the carburetor either from the space 17 or from the space occupied by the cylinders. The valve 27 comprises a substantially planar part 27', in the plane of the rod 28 which, in the position shown, extends forwardly of the air intake 14 to permit free flow of air therethrough, from the space 17. A depending valve part 27" occupies the opening 26 when the valve 27 is adjusted as shown, thereby preventing the admixture of warmed air from the engine compartment. When the valve 27, with its parts 27' and 27" is moved rearwardly by the rod 28, the part 27' closes the upper part of the intake 14, and the part 27" uncovers the opening 26 to permit of air flow therethrough. In the latter position, the valve part 27" lies adjacent the rear wall of the intake 14. In cool weather, when it is desired to supply relatively warm air to the carburetor, the rod 28 may be pushed rearwardly to allow air from the cylinder compartment to enter the carburetor, this air having been warmed, due to the interchange of heat from the cylinder walls thereto. In warm weather, when it is not desired to use the air previously heated by the cylinders, the rod 28 may be pushed forwardly to close off, by means of the valve 27, the opening 26, whereby air from the space 17 may enter the carburetor.

It will be seen that by the disposition of the annular air entrance 19, an efficient ram for relatively high air flow is created, which air is conducted by the various ducts to engine parts without destroying the symmetry of the engine installation, and without the use of external air scoops with their attendant aerodynamic drag. It is also within the realm of the disclosure to carry air ducts similar to those described from the space 17 to the oil tank forming part of the usual engine installation, whereby the tank surfaces may also be cooled.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In combination with a radial engine requiring cooling air flow directed to a plurality of points thereon, a pair of annularly spaced ring cowls encircling the engine at the outer cylinder ends, said cowls lying adjacent one another and being joined at their rear edges and being spaced at their forward edges to provide an air containing and entrance annulus, and a duct opening into the space between said cowls for directing cooling air from said space toward a portion of said engine.

2. In a radial cylinder engine having the forward portion thereof subject to direct impingement of cooling air flow, means for directing cooling air to parts not subject to such direct impingement comprising a double ring cowling circumscribing the outer cylinder ends the cowlings being spaced at the front and tapering to a common joint at the rear to provide an air entrance and containing space, and ducts leading from said annulus to said engine parts.

3. In a cooling system for a radial engine, a pair of spaced substantially parallel rings encircling a portion of the engine, the forward edges of said rings providing an air entrance annulus, and the rearward portions of said rings providing an air containing cavity closed at its rearward end, and means for directing air contained within said cavity to portions of the engine.

4. In combination with a radial cylinder air-cooled engine, an inner ring cowl encircling the outer cylinder ends, providing a relatively large frontal area within the confines thereof for permitting direct impingement of cooling air on the engine cylinders, an outer ring cowl encircling said inner cowl annularly spaced therefrom at its forward end and joined thereto at its rearward edge, providing, with said inner cowl, an annular space for receiving fresh cooling air, and means communicating with said space for directing air contained therein to the rear of said engine.

5. In combination with a radial cylinder engine having an air receiving duct rearward of the engine cylinders, a cowling comprising a pair of spaced substantially concentric rings encircling the engine, a duct communicating with said air receiving duct, with the space between said rings and with the space within the confines of the innermost of said rings, and a valve selectively operable to connect said air receiving duct with said first mentioned space or with said last mentioned space.

6. In combination with a radial cylinder engine, an inner ring encircling the outer cylinder ends, an outer ring encircling said inner ring and spaced radially outward therefrom at the leading edge and through the greater portion of the ring length, and tapering toward and joining said inner ring at the trailing edge thereof, whereby an annular space is provided around said engine into which air may flow upon forward movement of said engine and cowl rings to build up a pressure head of air within said space, said inner ring having an opening, and a duct registering with said opening and leading inwardly of said cowling to portions of the engine requiring air.

7. The combination with a cowled-in radial cylinder engine having an air entrance opening at the front end and an air exit opening at the rear of the engine cylinders, of an auxiliary ring cowl encircling said primary cowl, joined thereto at its trailing edge and annularly spaced therefrom forward of the trailing edge to provide an air-containing annulus within which a pressure head is built up by forward travel of the assembly, and ducts leading from said annulus to engine parts rearward of said engine cylinders.

8. The combination with a twin row radial cylinder engine, of a pair of encircling annular ring cowls, said cowls being radially spaced from one another at their one ends and joined to one another at their other ends, forming thereby an air-receiving and containing hollow, and ducts leading from said hollow, through the inner of said cowls, to direct air entrained within said hollow upon the rearward row of engine cylinders.

9. In combination with a radial cylinder engine, a pair of radially spaced ring cowls encircling the engine, the space between said cowls being open at the forward end and the cowl rings being joined at their rearward ends to provide an air containing inter-cowl hollow, an air-receiving duct within said cowls having communication with the inter-cowl hollow and with the space circumscribed by the inner cowl ring, and selectively operable means to establish communication between said duct and said hollow to the exclusion of communication between said duct and said space, and vice versa.

ROLAND CHILTON.